Aug. 23, 1955
W. B. JONES
2,715,755
PRODUCTION AND USE OF GASEOUS DISPERSIONS
OF SOLIDS AND PARTICULARLY OF FIBERS
Filed Nov. 22, 1949
3 Sheets-Sheet 1
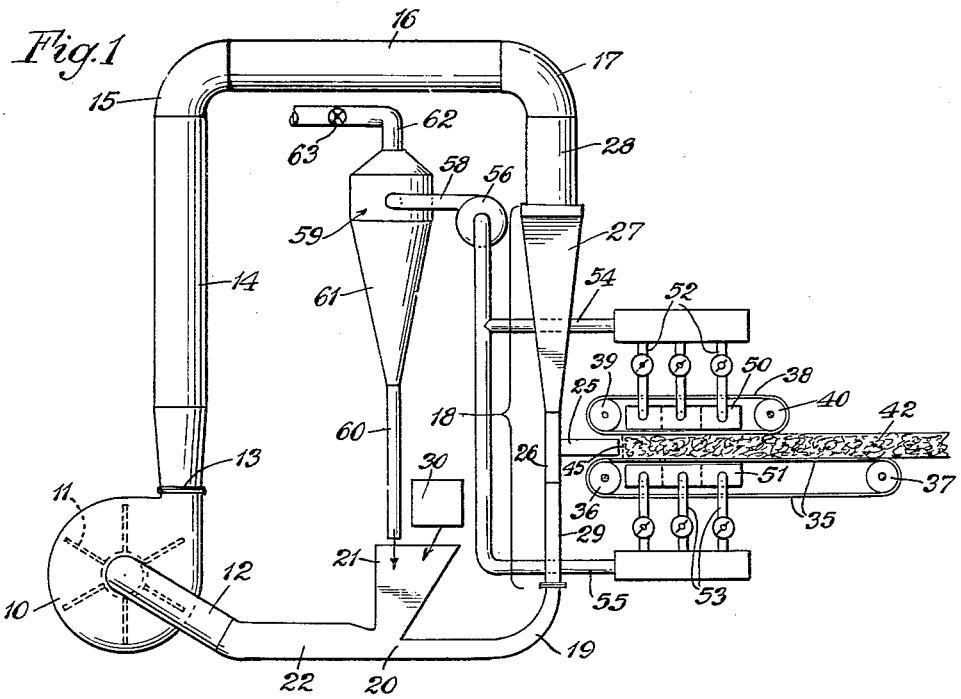
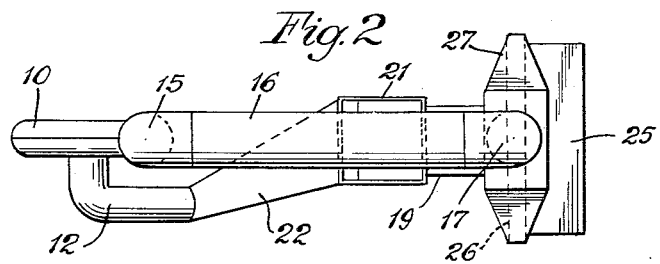
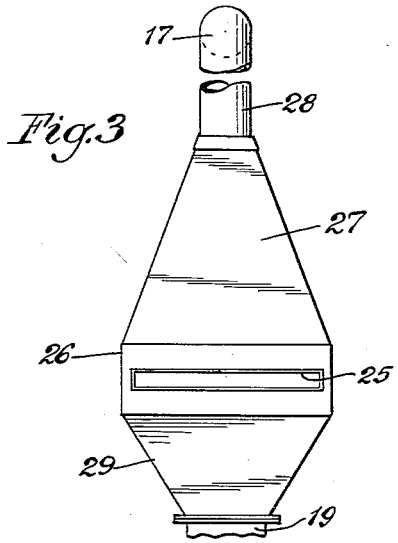
Inventor
W. Bartlett Jones, Aug. 23, 1955    W. B. JONES    2,715,755
PRODUCTION AND USE OF GASEOUS DISPERSIONS
OF SOLIDS AND PARTICULARLY OF FIBERS
Filed Nov. 22, 1949    3 Sheets-Sheet 2
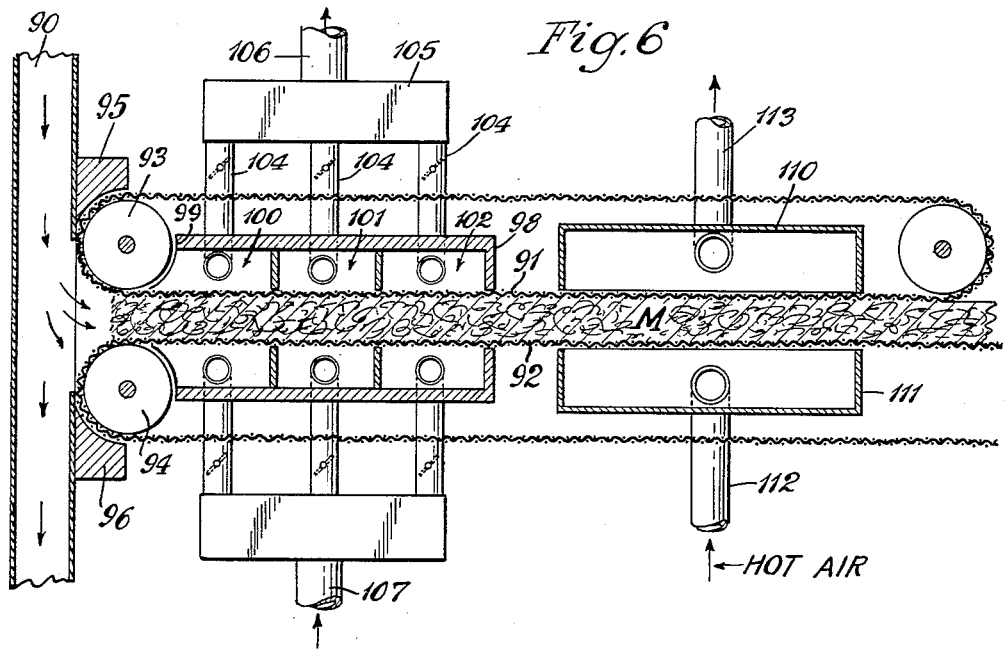
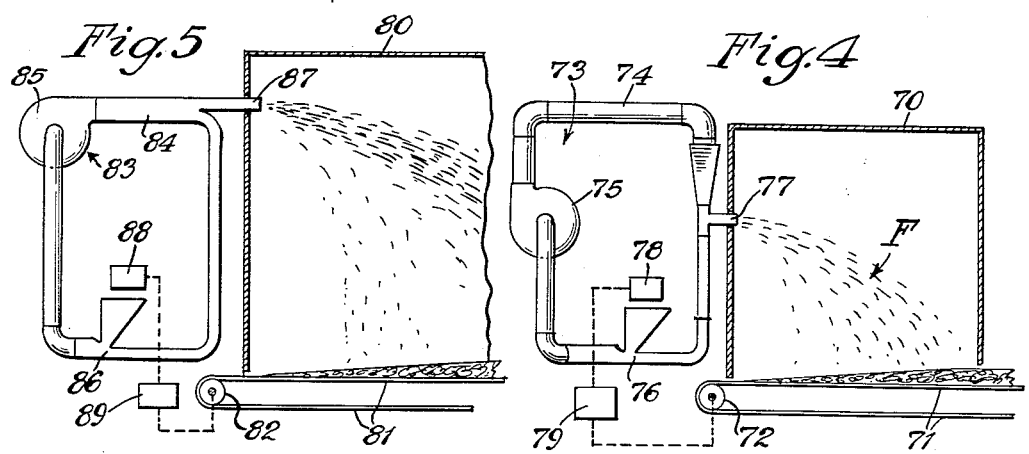
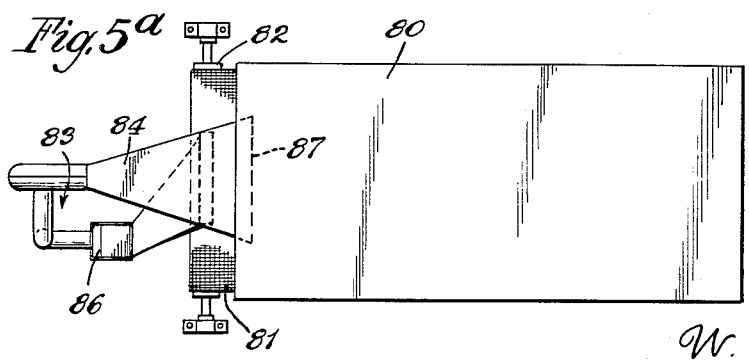
Inventor
W. Bartlett Jones Aug. 23, 1955 W. B. JONES 2,715,755
PRODUCTION AND USE OF GASEOUS DISPERSIONS
OF SOLIDS AND PARTICULARLY OF FIBERS
Filed Nov. 22, 1949 3 Sheets-Sheet 3
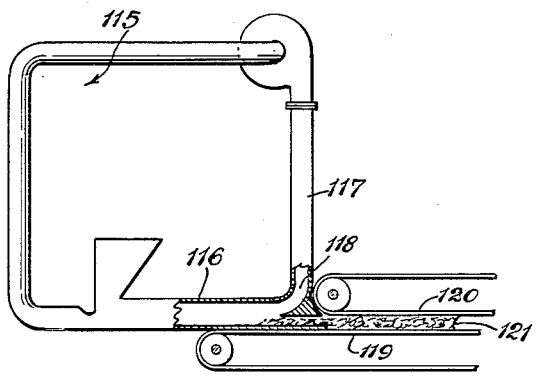
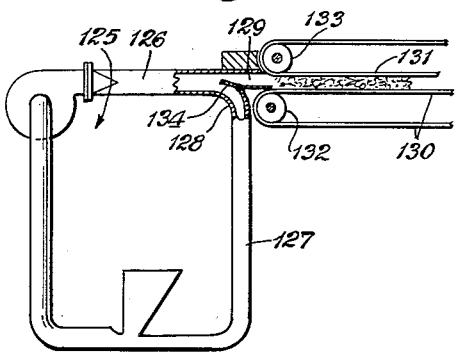
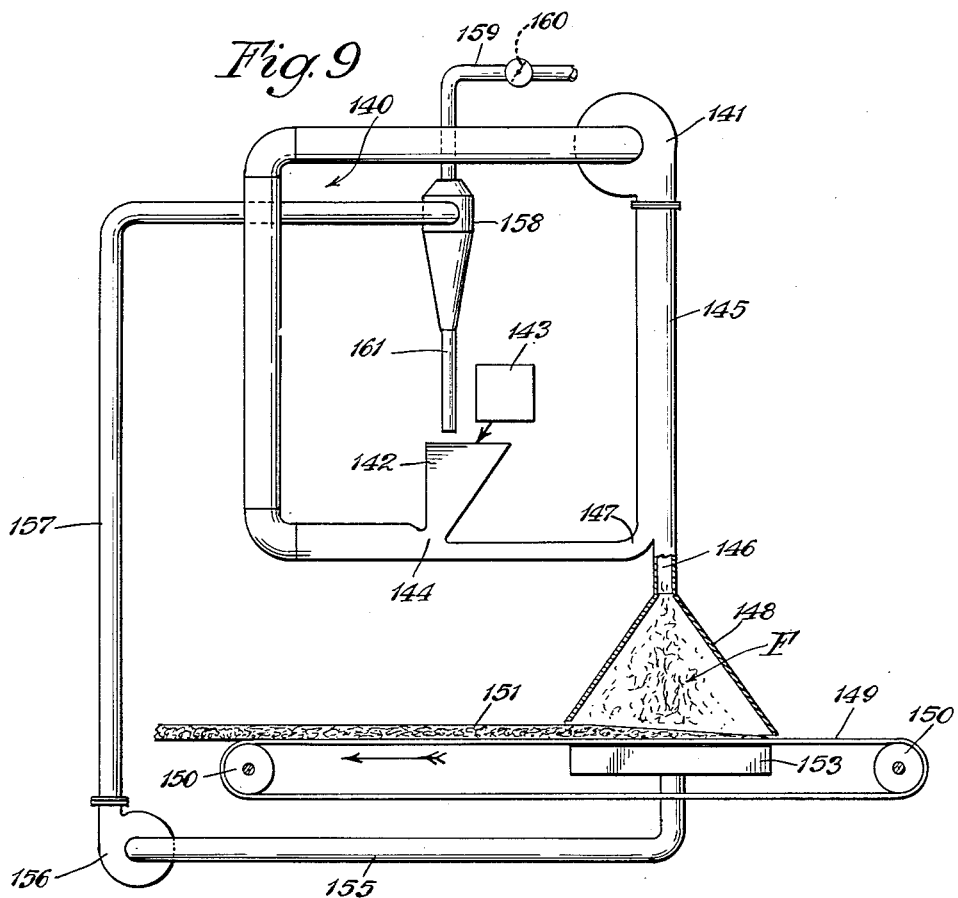
Inventor
W. Bartlett Jones,

United States Patent Office 2,715,755
Patented Aug. 23, 1955

2,715,755

PRODUCTION AND USE OF GASEOUS DISPERSIONS OF SOLIDS AND PARTICULARLY OF FIBERS

W. Bartlett Jones, Chicago, Ill., assignor to Wood Conversion Company, St. Paul, Minn., a corporation of Delaware Application November 22, 1949, Serial No. 128,764

11 Claims. (Cl. 19—156)

The present invention relates generally to the suspension of solids or a mixture of solids in gases, and in particular to such a suspension including fibers as a functioning component for producing felts.

In the art of forming fiber webs by deposition from suspension in air, there are encountered many problems, among them the continuous production of a uniformly concentrated suspension of substantially individualized fibers, or a mixture of such fibers and other material, such as a solid fusible binder in particle form. When a mixture of various kinds of particles is involved as the suspended phase, the problems are increased in that a uniformity of mixture also is an objective, as well as uniformity of concentration of that mixture in the gas.

It is well known that solids suspended in liquids may be maintained in suspension with comparative ease by agitation, which in degree of violence is somewhat proportional to the differential specific gravities of the liquid and the suspensoid. Because a gas is so much less viscous, and because of its character as a gas contrasted with the character of a liquid, the same situation does not obtain for gaseous suspensions. In the case of fiber suspension in a gas there is the added tendency of them to clot or flocculate, which is in part dependent upon the nature of the fiber. For example, kinky or curly fibers flocculate more easily than straight fibers.

Ultimate fibers of cellulose, and in particular, wood fibers, are curly or kinky in dry form in free static condition, whereas the same fibers suspended in water are straighter and more pliable, being plasticized by the water absorbed. Such fibers suspended in water have a specific gravity close to that of the water so that uniformity of suspension is easily maintained. However, in air, the dry fibers in suspension are relatively much heavier than the air, and accordingly tend to settle, and in settling to flocculate. In handling air suspensions of such vegetable fibers, it is difficult to avoid flocculation with the result that a suspension of flocks is readily obtained and difficult to avoid.

Individual fibers in nearly static condition may interlock or felt and the strength of the interlocking is sufficient to hold them together against forces tending to part them, for example, slightly increased movement. Strong movement tends to tear them apart. Masses or flocks of fibers fed to a powerful pneumatic blower are thereby individualized.

A blower acting on a gaseous suspension of fibrous material is a well-known dispersing means.

Fiber felts are formed from air suspensions of fibers by two general methods. In one the suspension is conveyed pneumatically into a suitable separator or screening means which is effective to separate the fibers from the air and thereby deposit the separated fibers as a felted mass. The second general method is to introduce the suspension into a settling chamber, and therein let the fibers disperse so that the fibers fall by gravity onto a receiving member. In both of these general ways of forming fiber felts or mats, it is well known in the art to use one or more endless moving conveyers on or between which the fiber is deposited.

In said two methods, when uniformity is desired in the mat, it is essential to move the endless conveyer at a fixed rate, to supply fiber in air suspension at a fixed rate for deposit on the endless conveyer at a fixed rate, and also essential to maintain uniformity of concentration and distribution to these ends.

The present invention is broadly directed to suspended solids, but because fiber as such a solid presents additional problems, the invention is more particularly illustrated and described by reference to fibers, without intention to limit the invention to fibers.

It is one object of the present invention to provide method and means for creating and maintaining a suspension of solids in a gas.

It is another object of the invention to provide and maintain a suspension of fibers in a gas and to provide an associated method and means for felting the fiber from such suspension.

It is also an object to provide method and means for forming uniformly dispersed mixtures of materials, and in particular, fiber and non-fibrous material which may be included with the fiber in a felt.

It is also an object to provide a circulating stream of air into which fibers to be felted are continuously dispersed and from which fibers are continuously removed as a felt or as dispersed fibers.

Various other and ancillary objects and advantages of the invention will be apparent to those skilled in the art from the following description and explanation of the invention, as illustrated in several embodiments in the accompanying drawings, by which:

Fig. 1 is a more or less diagrammatic represesentation of the apparatus.

Fig. 2 is a plan view of the circulating portion of the apparatus shown in Fig. 1.

Fig. 3 is a side elevation of the circulating portion of the apparatus shown in Fig. 1 with the felting fixture removed from the discharge spout.

Fig. 4 is a diagrammatic modification showing the circulating system of Fig. 1 used as a fiber feeder for a gravity deposition process of mat formation.

Fig. 5 is a view similar to Fig. 4 showing a modified manner of discharging from the circulating system.

Fig. 5a is a plan view of the apparatus of Fig. 5.

Fig. 6 is a modified vertical cross-sectional view similar to the felting portion of Fig. 1, showing modifications and additions.

Fig. 7 is a modification of the combined circulating and felting system of Fig. 1.

Fig. 8 is a modified form of Fig. 7, in which the velocity of fibers at deposition is high.

Fig. 9 is a modified form of the structure shown in Fig. 7, in which the felting is effected on a single screen by direct impact thereon rather than between two screens.

In general, the invention provides for the formation of a suspension of solids in gas and the maintaining of such suspension by a suitably vigorous movement of the suspension to keep the suspended particles in directed motion and uniformly distributed, and in the case of fibers to minimize the tendency to flocculate by imparting to the fibers a sufficient kinetic energy to facilitate maintenance of unclotted fibers. In doing this, the gaseous medium is continuously circulated in a well-defined pathway, and into the moving gas the fibers are dispersed, and from the dispersion fibers are deposited.

It is preferred that the fibrous suspension be continuously circulated in a substantially closed circuitous pathway which includes suitable means for maintaining the circulation, and suitable means for effecting initial dispersion or subsequent redispersion, and that a portion of the circulating suspension may be by-passed to a felting means which returns the depleted gas to the system. When only a fraction of the suspension is bypassed to a felting means, the remainder provides a reservoir of material in suspension at a uniform concentration and composition between the feeding means and the discharge opening. A suitable dispersing means is a mill with a rotor for urging material through a perforated casing. The mill may be a hammer mill in which swinging hammers on a rotor drive individual fibers through openings in a circumferential or arcuate screen close to the hammer ends. Such means are conventional fiber dispersers. A fan or blower may be used in the circuit with such a mill to carry the fibers away in an air stream. However, the dispersion means and the circulating means may be and are preferably and conveniently combined in one device when a high-speed fan-type blower is employed. It is thus apparent that a pneumatic circuit, including the housing of a blower, such as one having a rotary fan, and including a gas and suspended particles within the circuit, can, by operation of the fan, be maintained continuously as a source of a gaseous suspension of the solids. In drawing suspension from such source, the supply of what is lost must be replenished and maintained. The system or circuit may be open, as to the atmosphere, at such place or places where its static pressure corresponds to the external pressure, usually that of the atmosphere.

Where a portion of such a circulating suspension is diverted for use, it may happen that not all of the suspended solids are removed from the gas, in which case the residual gas may be returned in whole or in part to the circulating system for enrichment in such solids, or the residual solids are returned to the system.

Accordingly, in practical operation, such a circulating system is provided with one or more suitable openings for withdrawing a suspension of the solids, and further provided with suitable inlet or feeding means for introducing as much material, whether solid or gas, or both, as is lost by such withdrawal, when the objectives of uniformity, as above described, are to be met. In such a system, a gas is constantly circulated as solid material is fed in at one rate and when dispersed withdrawn at the same rate. Thus, in practical operation, where only a fraction of the circulating medium is involved in the withdrawal operation, and when there is some slight deviation between the rates of feeding and of withdrawal, the circulating surplus in the system is a sort of cushion for minimizing the effect of such deviation.

A circulation system of the character above described may be employed in the case of suspended fibers for forming felts by gravity deposition or by other means or methods of deposition as referred to above, and as more particularly described below.

The invention is illustrated by the embodiment shown in Fig. 1 wherein the numeral 10 represents a fan housing of the blower type, with the rotary fan 11 within it, which receives material substantially axially at the blower inlet 12 and discharges material centrifugally at the blower outlet 13. The said blower inlet and outlet are connected by means forming a circuitous pathway through which the gas and solids are recirculated. As shown in Fig. 1 there is a vertical riser 14 from the fan outlet 13, an elbow 15, a horizontal conduit 16, an elbow 17 leading to a downward portion of the conduit generally designated 18 in the drawing by a bracketed section. This is connected by an elbow section 19 in cross-section somewhat constricted relative to the cross-section of the portions 14, 15 and 16, because of provision for withdrawal of a fraction of the suspension within the section 18. The portion 19 feeds as a sort of a Venturi opening 20 into the bottom of the hopper 21, which is also connected by the conduit 22 to the lower inlet 12. The hopper 21 reresents an inlet or feeding means for the circuitous system, and the arrangement is such that there is no pressure tending to blow back to the atmosphere through the hopper 21. When a portion of the material is withdrawn within the section 18 without return of the air, the fan 11 draws in a replacing quantity of air at the hopper 21. In the case that there is no withdrawal of circulating suspension within the section 18, the pressure is balanced at the hopper by reason of the construction of the Venturi orifice 20.

The section 18 may be changed in many ways for many purposes. One way is illustrated particularly in Fig. 1. The section 18 is constructed to enlarge the conduit in one dimension so that a wide rectangular discharge spout or nozzle 25 may be provided. This spout 25 is shown as formed integrally with a vertical section 26 having a rectangular cross-section and being very thin in its vertical extent. The vertical section 26 is connected to a hood-like tapering section 27 which connects with a short circular pipe section 28 jointed to the elbow 17. The bottom part of the vertical section 26 also is connected by a thin tapering hood-like section 29 which is connected to the elbow section 19, not circular, but rectangular in cross-section for entry into hopper 21 at orifice 20.

In operation the system described may be loaded with solids in any amount suitable for suspension therein without danger of clogging or packing the system. Heavy suspensions or light suspensions may be obtained. The solids content may be a single substance or a mixture of substances, and particularly it may be dry vegetable fibers, or dry vegetable fibers and a quantity of solid particles to serve as a binder. The binder may be powdered rosin, powdered synthetic resin, powdered pitch, asphalt or other material. Assuming the system to be operating at a given concentration of solids in suspension, at the discharge outlet 25 there may be some obstruction effectively closing the outlet so that there is no loss of material. When this closure or other condition is charged so that there is differential pressure existing at the outlet 25 with higher pressure in the system, there is a flow of material outwardly by way of spout 25, and this flow may be against atmospheric pressure, superatmospheric pressure, or sub-atmospheric pressure, as desired. The differential pressure may thus be changed to predetermine the amount of suspended material leaving the system. Accordingly, the same amount of solid material must be put into the system. For this purpose, a suitable controlled feeding means 30 is indicated.

In practical operation, the material may be moving in the system at high velocities, such as a mile a minute. In Fig. 1 this is a downward vertical velocity in section 18. When a particle moves from this downward path, horizontally through the spout 25, it begins horizontal movement at zero velocity and accelerates horizontally until it attains the velocity of the accompanying air. The actual path travelled will vary by reason of a decreasing downward vertical component and an increasing horizontal component. Baffles, not shown, opposite the outlet 25 in the main conduit may add to the complexity.

It is well known that the character of felting on deposition of fibers depends upon the impact and direction of deposition. Consequently, along the direction of the horizontal spout 25 there is a region in which the character of the felt may be controlled by reason of the location of the line or zone of deposition. If the line of deposition lies within the region of acceleration in horizontal velocity, a movement of the line of deposition changes the character of the felt by reason of the changing impact and direction at the time of deposition. Consequently, for uniformity of felting, it is essential that uniformity of conditions be maintained so that the line of deposition is constant. Conversely, the character of the felt may be changed by controlling the position of the line of deposition. By having the line of deposition as close as possible to the downward vertical path of the suspension in the section 18, the fibers may be deposited in a very loose and low-density felt by reason of the low horizontal velocity at the time of deposit.

Accordingly there may be means for controlling the line of deposition. As illustrated, the spout 25 discharges into a depositing chamber formed at the top and bottom by endless wire screens, and on the side by closure walls. At the bottom of the forming chamber there is an endless wire screen 35 moving over rolls 36 and 37. At the top there is an endless wire screen 38 moving at the same speed as the screen 35 over rolls 39 and 40. As shown, the upper stretch on the bottom forming-screen 35 is longer than the lower stretch of the upper forming-screen 38 in order to give access to the formed mat portion 42 indicated in the drawing.

As shown more or less diagrammatically in Fig. 1, the material discharged from the spout 25 passes into the forming chamber and deposits therein. The line 45 merely indicates graphically that there is a line of deposition. The location of this line obviously depends upon the prevailing conditions and the extent to which the air is allowed to be removed through the forming screens and permit deposition of the fibers as the mat 42. The stretches of the forming and screening conveyers against which the web 42 is formed may be open to the atmosphere so that the differential pressure for the formation involves that of the atmosphere on the low side, and that within the circulating system on the high side, as effected by operation of the fan 11. In part for the purpose of control or of increasing the differential pressure, there may be one or more suction boxes over these stretches of the forming screens. Thus, the degree of suction may be varied as desired for controlling the position of the line of deposition or the character of the felt. The suction box may be divided into several sections, each separately controlled as to its extent of suction.

In the drawings there is shown a suction box 50 above the forming stretch of the screen 38, and suction box 51 below the upper stretch of the lower forming screen 35. These suction boxes are each indicated as having three separate sections, each with its dampered suction conduit 52 at the top and 53 at the bottom. These dampered suction conduits 52 and 53 are connected respectively by conduits 54 and 55 to the inlet of a blower housing 56, the operation of whose rotor creates and controls the suction, in conjunction with operation of the dampers. The discharge side of the blower 56 may exhaust to the atmosphere or back into the circulating system. In some cases the discharge line 58 may contain fiber fines or fines of other solid material which have escaped into the exhaust system through the forming screens 35 and 38. Where such material is of value or of functional importance, it may be collected by a suitable cyclone and saved for return to the system, or the replacement solids may be introduced with the returning air stream. The discharge line 58 may be connected back into the system in a manner to conserve all the solids, and preferably in a manner to eliminate and discharge some of the air. This may be done by connecting the conduit 58 indirectly to the circulating system to facilitate a self-control of air taken in, as by the use of a so-called down-draft cyclone, or one which concentrates the solids in suspension by separating and removing some of the air entering it.

In Fig. 1 the conduit 58 enters cyclone 59, placed above the hopper 21, into the opening of which a down-draft conduit 60 leads from the apex of the cone portion 61. The top of the cyclone is vented through a conduit 62 having a controllable damper 63. Air with entrained solids enters the cyclone via conduit 58. The damper 63 may be adjusted to bleed off part of the air while the remainder is thus enriched in the solids and moves downwardly into the hopper 21. The amount of air diverted from the main loop and thus lost is taken in at the hopper 21, and since this amount is preferably made to exceed that in down-draft conduit 60, the enriched suspension in conduit 60 is drawn back into the system.

However, there are a variety of modes of operation, depending upon the relative capacities at which the blowers 10 and 56 are operated. Suppose that the suction by blower 56 is so strong that it draws air into the system through the felt 42 where it emerges from between the two endless screens. This will return to cyclone 59 more air than leaves the main loop via the spout 25. Hence the excess, and preferably more than that is bled off by opening damper 63, thus to discharge via conduit 60 less air than the hopper 21 must take in.

On the other hand, suppose that the suction by blower 56 is so weak that some of the air leaving the main loop via spout 25 is lost by leakage through the felt 42. The consequence is that cyclone 59 receives less air than the hopper 21 must take in. In that case, the damper 63 may be entirely closed, thus to render the cyclone ineffective and without function. Thus, the outlet of blower 56 is in effect connected directly to the main loop and all of its discharge can be taken into the main loop at the hopper 21 along with such additional air as is required. However, as a matter of precaution to limit need for close control, it is preferred to exhaust air at the vent 62, and to exhaust a concentrated suspension of fines via conduit 60, so that the relative capacities of the two blowers in operation may be disregarded insofar as the return of the fines is involved. Some of the air withdrawn at the spout 25 may escape to the atmosphere by reason of its leakage through the formed web 42 and the regions not adequately covered by the suction boxes. However, construction may minimize or enhance this leakage as circumstances require or permit, or even draw air into the suction system in the reverse direction.

The invention may be used in various modifications, some of which are described below.

In Fig. 4 the numeral 70 designates a gravity deposition chamber, such as that shown in Brownlee, Patent No. 2,363,480, having at the bottom an endless forming conveyer 71 on which fibers are deposited by gravity to build up a mat. The numeral 72 represents an end-roll over which the endless conveyer 71 turns, and for convenience, roll 72 represents the control for rate of movement of the conveyer 71.

The numeral 73 generally designates a circulation system like that described in reference to Fig. 1, having a continuous pathway formed by various conduit means designated 74, including in series therewith a blower 75, and including a Venturi opening 76 into which material is fed. The system also has an outlet for discharge spout 77 similar to the spout 25 in Fig. 1, which spout feeds directly into the chamber 70. The pressure in the circuit 73 operating against atmospheric pressure in the chamber 70 causes an efflux of fiber and air from the spout 77. It is characteristic of the moving fiber designated F that it enters the chamber with very low horizontal velocity and hence does not carry far into the chamber 70. The numeral 78 designates feeding means for fiber to enter the circulation system, and the numeral 79 represents a master control from which the dotted lines leading to feed device 78 and conveyer roll 72 represent controls for carrying out of the chamber 70 as much fiber as is fed into the circulating system by the feeder 78.

Fig. 5 represents a combination of equipment very similar to that in Fig. 4, but the spout for discharge of the fiber from the circulation system is arranged so that fiber is discharged with the velocity obtaining generally in the top leg of the circulation system. The numeral 80 designates a deposition chamber in the bottom of which runs an endless conveyer 81 over a drive roll 82. The numeral 83 generally designates the circulation system having a series of conduits 84 including in series the dispersing blower 85 and the Venturi connection 86, where fiber and air may enter the system. The numeral 87 represents a discharge spout which is an extension of one of the straight legs of the circulation conduit system 84, the spout 87 taking off a portion of the circulating suspension of which the remainder continues within the circulation system. The numeral 88 represents a feeding device for material to be dispersed in the system through the Venturi opening 86. The numeral 89 represents a control device operating, as indicated by the dotted lines, to control the feeding device 88 and the drive roll 82 of the conveyor 81 for equalizing the fiber input and output of the apparatus described. The top leg 84 and spout 87 are preferably flaring for a wide chamber 80, as indicated in Fig. 5ª.

Fig. 6 is another modification similar to the forming arrangement shown in Fig. 1, wherein the line of deposition is brought as close as possible to the main path of the circulation. The numeral 90 represents one leg of the circulation system, comparable to the section 18 in Fig. 1. Upper and lower forming screens 91 and 92 are arranged for the formation of a felt between them. These respectively pass over the rolls 93 and 94, which fit tangentially into an opening in the leg 90, being suitably sealed off by obstructing devices 95 and 96. In order to control suction at various points near the inlet end of the forming space, there are provided suction chambers similar to those described in Fig. 1. Above the lower and forming stretch of the upper screen 91 there is a suction box of which the top wall 98 has its edge 99 adequately sealed against the roll 93. The suction box is divided into three chambers 100, 101 and 102, each of which is connected by openings therein to the dampered suction pipes, all designated 104, connected to manifold 105 from which conduit 106 leads to an exhausting device for creating suction. A similar suction box is shown below the upper stretch of the lower forming screen, its conduit 107 leading to the same or a different suction device. Preferably, the exhaust conduits 106 and 107 lead back into the circulation system in the manner described in connection with Fig. 1, in order to return valuable fines which may pass through the screens, such as powdered solid bonding material useful in the particular arrangement of Fig. 6.

In the present instance the device of Fig. 6 is suitable for forming a very low density felt, because the fibers deposit through horizontal motion at substantially zero or a very low horizontal velocity. The resulting impact gives a very low degree of felting. A low degree of felting is very desirable where the mixture felted is fiber containing solid particles of a fusible bonding material, such as a thermosetting resin binder. The formed low-density mat designated M continues its movement between the screens 91 and 92 so that it traverses a region where hot air may be blown through the low density felt at a sufficient temperature and under suitable conditions merely to activate the solid particles to surface adhesiveness without entirely fusing the same, or thermosetting them in the case of thermosetting resins. The effect of this is to anchor the poorly felted fibers together in a low density mat so that it has considerable strength from the bonding, rather than the felting, in order that it may be handled and adaptable for deformation as a preform for thermosetting molding operations, in which the heat of thermosetting releases the fiber from the bonds and permits additional felting for strength. An additional advantage of this hot-bonding operation on the originally-formed felt is that the bonding particles are anchored in place at their original locations of uniform distribution, and are thus guarded against settling through the highly porous mat in a manner to result in non-uniform distribution.

For this purpose there are provided over the upper forming-screen a housing 110 and below the lower forming-screen a housing 111, each connected to conduits and each in register with the other. For example, through conduit 112 hot air may be introduced into housing 111 for passage through the mat M for discharge through the conduit 113.

Fig. 7 represents a modification in which the forming screen is shown so arranged that the fibers must reverse their direction in order to deposit. The numeral 115 designates generally a circulation system according to the character described, in which the bottom leg 116 receives circulating dispersion from the downward vertical leg 117 via elbow 118. The space beneath the elbow 118 is a horizontal extension of the leg 116 for provision of an outlet opening. This opening is bounded by forming conveyer screens 119 at the bottom and 120 at the top, between which a mat 121 may be formed.

Fig. 8 represents in effect, a reversal of discharge conditions from those described in Fig. 7, such that the fibers are carried into the felting zone at their velocity of circulation, quite similar to the discharge arrangement in Fig. 5. The numeral 125 designates generally a circulation system of the character generally described, of which the top leg 126 is connected to downward vertical leg 127 via elbow 128 above which there is an opening or extension 129 of the leg 126. Thus, the material flowing in the leg 126 becomes divided, and part of it continues in the circulating system while the remainder passes through the opening 129 into a forming space formed between the endless screens 130 and 131 passing over the respective rolls 132 and 133 located adjacent the extension 129. Numeral 134 represents a hinged divider plate to change the ratio of the divided streams. By this arrangement the mat is formed at high density resulting from the higher velocity of impact.

It is, of course, to be understood that in those cases where the exhaust air is not illustrated as being returned to the system, as in Figs. 4, 5, 6, 7 and 8, the exhaust air, which may contain fines of the fibers or other material mixed therewith, may be readily conducted back into the system as illustrated in Figs. 1 and 9, or otherwise be cleansed of its suspended solids which latter may be returned as solids to the circulation system. Use of the exhaust air as infed air for the system is highly advantageous in many respects. As to its content of fines, the fines are saved and used in a kind of formation from which they initially escape. In winter, changes of housing air are minimized by such return of exhausted air. Also, the less new air employed in the operation, the more constant are the conditions of humidity and temperature in the system.

Fig. 9 is another modification showing use of the well known principle of forced felting of fibers from air suspension by direct impact of a moving gaseous dispersion of fibers onto a moving screening conveyer. Since such a process is readily conducive to the passage of fines through the screen, these are captured and returned. The dispersion for such felting is prepared in and drawn from a circulating system in which dispersion is constantly being formed and maintained, and into this circulating system some of the exhaust from the felting screen and all of its contained fines are returned for recirculation and eventual recapture of the fines on the felting screen.

This is briefly represented in Fig. 9, wherein the numeral 140 represents a circulating system of the kind described, including a blower 141 which also functions as a disperser for fibrous material fed into a hopper 142 from a feeding device 143, preferably controlled in relation to the fiber removed from the system. This hopper 142 leads into the system at a Venturi opening 144 so that any air needed in the system is automatically brought in by way of the hopper. The circulating system has a downward leg 145, which at its bottom branches into an extension thereof 146 and elbowed connection 147 which forms part of the circulating system 140. The downward extension 146 communicates with a shielding hood 148 terminating above an endless felting screen 149, running over rolls 150 operating at a speed related to the controlled feed at 143. Fiber F in suspension in the hood deposits on the screen 149 forming the felt 151, which is carried away by the screen. Under the hood space there is a suction box 153 connected by conduit 155 to a suction fan 156 which discharges in a suitable manner to return any fines therein back into the circulating system, preferably at the Venturi opening 144.

The nature of the apparatus described, with a space open to the atmosphere between the hood and screen, effects deposition at substantially atmospheric pressure. With air in conduit 146 at superatmospheric pressure, and under the wire at sub-atmospheric pressure, there must be an intervening region of atmospheric pressure. To assure retention of solids within the hood structure, the degree of suction relative to the pressure in the hood is adjusted so that some air from the atmosphere is drawn into the hood and into the exhaust system. Since suction is stronger at the side of the hood where the screen enters, by reason of no felt formation therein, the hood on that side is closer to the screen. The excess air cannot all be returned to the circuit 140. Where its content of solids is all to be returned to the circuit 140, it is preferred to deplete the amount of air in the exhaust system. A down-draft cyclone as used in Fig. 1 is the preferred means. So employed, the suction blower 156 is connected by conduit 157 into cyclone 158, which bleeds off some air via outlet 159, controlled by damper 160. This permits discharging an enriched mixture via conduit 161 into hopper 142. The amount of new air required by the circuit 140 for entry at hopper 142 is so controlled as to exceed the air supplied by conduit 161, to assure a sufficient suction at the hopper to draw in all the discharged fines.

From the foregoing it is apparent that there is a circuitous pathway for a suspension of solids, from which a portion of the solids is withdrawn as a deposit, the undeposited material being recycled and in being recycled being redispersed and fortified with newly dispersed material.

Accordingly, the invention is subject to numerous modifications as indicated by the scope of the appended claims.

I claim:

1. Apparatus comprising in combination conduit means providing a circuitous pathway for a stream of solids suspended in gas, a blower and housing included in said means for forming a part of said pathway and for operation of the blower to effect and maintain circulation of said stream, and continuously operable infeeding means opening into said conduit means for introducing gas and solids for dispersive mixing and circulation, there being an outlet opening in said conduit means through which a portion of the circulating stream may move in leaving the circuitous pathway, whereby upon continuously feeding gas and solids into said inlet means there is discharged through said opening a continuous stream of gaseous suspension of the solids.

2. Apparatus comprising in combination conduit means providing a circuitous pathway for a stream of solids suspended in gas, a blower and housing included in said means for forming a part of said pathway and for operation of the blower to effect and maintain circulation of said stream, continuously operable infeeding means opening into said conduit means for introducing gas and solids for dispersive mixing and circulation, there being an outlet opening in said conduit means through which a portion of the circulating stream may move in leaving the circuitous pathway, whereby upon continuously feeding gas and solids into said inlet means there is discharged through said opening a continuous stream of gaseous suspension of the solids, and separating means connected to said opening for separating solids from gas.

3. Apparatus comprising in combination conduit means providing a circuitous pathway for a stream of solids suspended in gas, a blower and housing included in said means for forming a part of said pathway and for operation of the blower to effect and maintain circulation of said stream, continuously operable infeeding means opening into said conduit means for introducing gas and solids for dispersive mixing and circulation, there being an outlet opening in said conduit means through which a portion of the circulating stream may move in leaving the circuitous pathway, whereby upon continuously feeding gas and solids into said inlet means there is discharged through said opening a continuous stream of gaseous suspension of the solids, screening means connected to said opening for separating solids from gas, and means continuously to move said screening means for removing the screened material from the path of the gas.

4. Apparatus comprising in combination conduit means providing a circuitous pathway for a stream of solids suspended in gas, a blower and housing included in said means for forming a part of said pathway and for operation of the blower to effect and maintain circulation of said stream, and continuously operable infeeding means opening into said conduit means for introducing gas and solids for dispersive mixing and circulation, there being an outlet opening in said conduit means at a location therein in the direct path of a portion only of the moving stream whereby a portion of the circulating stream may move out of said circuitous pathway without change in direction in passing through said opening, whereby upon continuously feeding gas and solids into said inlet means there is discharged through said opening a continuous stream of gaseous suspension of the solids.

5. Apparatus comprising in combination conduit means providing a circuitous pathway for a stream of solids suspended in gas, a blower and housing included in said means for forming a part of said pathway and for operation of the blower to effect and maintain circulation of said stream, continuously operable infeeding means opening into said conduit means for introducing gas and solids for dispersive mixing and circulation, there being an outlet opening in said conduit means through which a portion of the circulating stream may move without change in direction in leaving the circuitous pathway, whereby upon continuously feeding gas and solids into said inlet means there is discharged through said opening a continuous stream of gaseous suspension of the solids, and screening means connected to said opening for separating solids from gas.

6. The method of producing a dispersion of solids in gas which comprises forming and maintaining a continuously circulating stream of gas and solids, feeding into said stream gas and solids, dispersing and suspending the said fed-in solids within said stream prior to any removal of said fed-in solids from the stream, and removing from circulation a portion of the resulting stream as a dispersion of solids in gas, the rates of feeding and of removal of both solids and gas being maintained at substantial equality.

7. The method of producing a dispersion of solids in gas which comprises forming and maintaining a continuously circulating stream of gas and solids, feeding into said stream gas and solids, dispersing and suspending the said fed-in solids within said stream prior to any removal of said fed-in solids from the stream, and removing from circulation a portion of the resulting stream as a dispersion of solids in gas, the rates of feeding and of removal of both solids and gas being maintained at substantial equality, said removal being effected without change in direction of the removed portion in leaving the remaining circulating portion.

8. The method of producing a felted deposit of solids including fibers which comprises forming and maintaining a continuously circulating stream of gas and said solids, feeding into said stream gas and said solids, dispersing and suspending the said fed-in solids within said stream prior to any removal of said fed-in solids from the resulting stream, removing from circulation a portion of the resulting stream as said dispersion of said solids in gas, the rates of feeding and of removal of both solids and gas being maintained at substantial equality, continuously separating said removed dispersion into gas and a continuously forming felted deposit of said solids, and moving said deposit away from the place of deposition.

9. The method of producing a felt from a dispersion of solids including fibers in gas which comprises forming and maintaining a continuously circulating stream of gas and said solids, feeding said solids into said stream, dispersing and suspending the said fed-in solids within said stream prior to any removal of said fed-in solids from the stream, continuously filtering a movable felt of said solids from a portion of the resulting stream, continuously moving said felt out of the path of the removed portion of the stream, the rates of feeding solids and of removing solids as a felt being substantially the same, and returning any solids passing through the felt to the circulating stream.

10. A device of the character described comprising a bat-forming chamber having spaced movable foraminous filtering screens, means for continuously moving said screens at the same velocity for carrying away a bat formed between them, a nozzle arranged to discharge a mixture of air and fiber for felting into said chamber, two interlinked circulatory air-convection systems having one portion in common, the first system consisting in sequence of a blower, a first conduit connecting the inlet opening of the blower to the receiving end of said nozzle, said conduit between said nozzle and said blower being open to the atmosphere for feeding in air and fiber, and a second conduit connecting the discharge end of the blower to the junction of the first conduit and the nozzle, the second circulatory system having in sequence, a portion of the first circulatory system beginning between the nozzle and the blower inlet, which portion includes its blower, and which portion ends at the nozzle, then the nozzle, the bat-forming chamber, vacuum box means associated with the screening means of said chamber, conduit means therefrom to a second blower inlet, a second blower, a tangential inlet conduit from a cyclone to the outlet of said second blower, a cyclone and a cyclone discharge outlet for a solids concentrate discharging into the first conduit of the first circulatory system, said cyclone having a vent to the atmosphere.

11. A device of the character described comprising a bat-forming region having a movable foraminous filtering screen, means for continuously moving said screen for carrying away a bat formed thereon, a nozzle arranged to discharge a mixture of air and fiber into said region for felting on said screen and for passage of air through said screen, two interlinked circulatory air-convection systems having one portion in common, the first system consisting in sequence of a blower, a first conduit connecting the inlet opening of the blower to the receiving end of said nozzle, said conduit between said nozzle and said blower being open to the atmosphere for feeding in air and fiber, and a second conduit connecting the discharge end of the blower to the junction of the first conduit and the nozzle, the second circulatory system having in sequence, a portion of the first circulatory system beginning between the nozzle and the blower inlet, which portion includes its blower, and which portion ends at the nozzle, then the nozzle, the bat-forming chamber, vacuum box means associated with the screen, conduit means therefrom to a second blower inlet, a second blower, a tangential inlet conduit from a cyclone to the outlet of said second blower, a cyclone and a cyclone discharge outlet for a solids concentrate discharging into the first conduit of the first circulatory system, said cyclone having a vent to the atmosphere.

References Cited in the file of this patent

UNITED STATES PATENTS

| | | |
|---|---|---|
| 1,704,714 | Swanson | Mar. 12, 1929 |
| 1,799,506 | Frederick | Apr. 7, 1931 |
| 2,086,517 | Aldrich | July 13, 1937 |
| 2,218,338 | Manning | Oct. 15, 1940 |
| 2,431,066 | Miller | Nov. 18, 1947 |
| 2,489,079 | Clark et al. | Nov. 22, 1949 |
| 2,544,019 | Heritage | Mar. 6, 1951 |
| 2,618,816 | Joa | Nov. 25, 1952 |

FOREIGN PATENTS

| | | |
|---|---|---|
| 294,079 | Germany | Sept. 11, 1916 |